(12) United States Patent
Zavesky et al.

(10) Patent No.: US 12,273,822 B2
(45) Date of Patent: *Apr. 8, 2025

(54) FACILITATING REAL-TIME POWER OPTIMIZATION IN ADVANCED NETWORKS

(71) Applicant: AT&T Intellectual Property I, L.P., Atlanta, GA (US)

(72) Inventors: Eric Zavesky, Austin, TX (US); Yupeng Jia, Austin, TX (US); Yizhe Zhang, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 407 days.

This patent is subject to a terminal disclaimer.

(21) Appl. No.: 17/823,201

(22) Filed: Aug. 30, 2022

(65) Prior Publication Data

US 2022/0417863 A1  Dec. 29, 2022

Related U.S. Application Data

(63) Continuation of application No. 16/891,763, filed on Jun. 3, 2020, now Pat. No. 11,470,560.

(51) Int. Cl.
*H04W 52/14* (2009.01)
*H04W 52/22* (2009.01)
(Continued)

(52) U.S. Cl.
CPC ....... *H04W 52/146* (2013.01); *H04W 52/228* (2013.01); *H04W 52/265* (2013.01); *H04W 52/283* (2013.01); *H04W 52/288* (2013.01)

(58) Field of Classification Search
CPC ............. H04W 52/146; H04W 52/228; H04W 52/265; H04W 52/283; H04W 52/288;
(Continued)

(56) References Cited

U.S. PATENT DOCUMENTS 10,952,024 B2  3/2021  Jia et al.
11,470,560 B2 * 10/2022  Zavesky ............. H04W 52/228
(Continued)

OTHER PUBLICATIONS

Palladino T., "Magic Leap App SeeSignal Uses AR to Help You Find & Touch the Strongest Cellular, Wi-Fi, & Bluetooth Signals" AR Business, Sep. 30, 2019, 5 pages.
(Continued)

*Primary Examiner* — Lana N Le
(74) *Attorney, Agent, or Firm* — Guntin & Gust, PLC; John G. Rauch

(57) ABSTRACT

Facilitating real-time power optimization in advanced networks (e.g., 5G, 6G, and beyond) is provided herein. Operations of a method can include determining, by a system comprising a memory and a processor, a power distribution setting for a user equipment that includes multiple radios based on a historical radio power usage, a historical performance result, a current location, and an application currently executing on the user equipment. The method also can include implementing, by the system, the power distribution setting across the multiple radios of the user equipment. The first radio of the multiple radios can be a first radio type and a second radio of the multiple radios can be a second radio type, different from the first radio type.

20 Claims, 12 Drawing Sheets

(51) Int. Cl.
*H04W 52/26* (2009.01)
*H04W 52/28* (2009.01)

(58) Field of Classification Search
CPC ............. H04W 52/346; H04W 52/223; H04W 52/225; H04W 52/22; G06N 3/047; G06N 3/08; G06N 7/01; G06N 20/00; G06N 5/045; G06N 3/043; G06N 5/025; G06N 3/092; H02J 3/00; H02J 2203/10; H02J 50/80; H02J 50/40; H02J 13/00034
See application file for complete search history.

(56) References Cited

U.S. PATENT DOCUMENTS

| | | | |
|---|---|---|---|
| 2008/0045271 A1* | 2/2008 | Azuma | H04W 52/223 455/561 |
| 2011/0143805 A1* | 6/2011 | Ramasamy | H04W 52/346 455/67.11 |
| 2015/0341869 A1 | 11/2015 | Sen et al. | |
| 2016/0360429 A1* | 12/2016 | Li | H04W 88/08 |
| 2017/0118715 A1 | 4/2017 | Bhattacharya et al. | |
| 2018/0205471 A1 | 7/2018 | Goodbody | |
| 2020/0107296 A1 | 4/2020 | Zhang et al. | |
| 2020/0329340 A1 | 10/2020 | Rahman | |
| 2021/0044927 A1 | 2/2021 | Jia et al. | |
| 2021/0114616 A1 | 4/2021 | Atlman | |
| 2021/0119881 A1 | 4/2021 | Shirazipour et al. | |
| 2021/0127231 A1 | 4/2021 | Jia et al. | |
| 2022/0369245 A1* | 11/2022 | Takeda | H04W 52/146 |

OTHER PUBLICATIONS

Final Office Action received for U.S. Appl. No. 16/710,165 dated Feb. 23, 2022, 34 pages.
Wi-CHarge: Over-the-Air Wireless Power. Web accessed on May 20, 2022 https://www.wi-charge.com/., 4 pages.
The World's Most Powerful Low Light Energy Harvesting Photovoltaic Cells Ambient Photonics web accessed on May 20, 2022 https://ambientphotonics.com/technology., 2 pages.
Non-Final Office Action received for U.S. Appl. No. 16/710,165 dated Aug. 5, 2021, 34 pages.
Non-Final Office Action received for U.S. Appl. No. 16/710,165 dated Jul. 7, 2022, 45 pages.
Non-Final Office Action received for U.S. Appl. No. 16/891,763 dated Feb. 9, 2022, 41 pages.
Antenna Selection and Device Orientation Pending U.S. Appl. No. 16/534,518, filed Aug. 7, 2019, 20 pages.
U.S. Appl. No. 16/891,763, filed Jun. 3, 2020.

* cited by examiner

FACILITATING REAL-TIME POWER OPTIMIZATION IN ADVANCED NETWORKS

RELATED APPLICATION

The subject patent application is a continuation of, and claims priority to, U.S. patent application Ser. No. 16/891,763, filed Jun. 3, 2020, and entitled "DETERMINING POWER OPTIMIZATION FOR MULTIPLE RADIOS BASED ON HISTORICAL POWER USAGE IN ADVANCED NETWORKS," the entirety of which priority application is hereby incorporated by reference herein.

TECHNICAL FIELD

This disclosure relates generally to managing devices with multiple radio in Fifth Generation (5G), Sixth Generation (6G), or other advanced networks and, more specifically, to a power management across radio types of a device having multiple radios using reinforcement learning and predictive analysis.

BACKGROUND

The use of computing devices is ubiquitous. These computing devices include radios and antenna elements, which allow the computing devices to communicate with other devices, as well as to access various networks (e.g., cellphone network, internet network, satellite network, and so on). A growing percentage of the computing devices in use today have multiple radios and antenna elements in order to provide various wireless services. Unique challenges exist to provide real-time power optimization of the multiple radios and antenna elements and in view of forthcoming 5G, 6G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
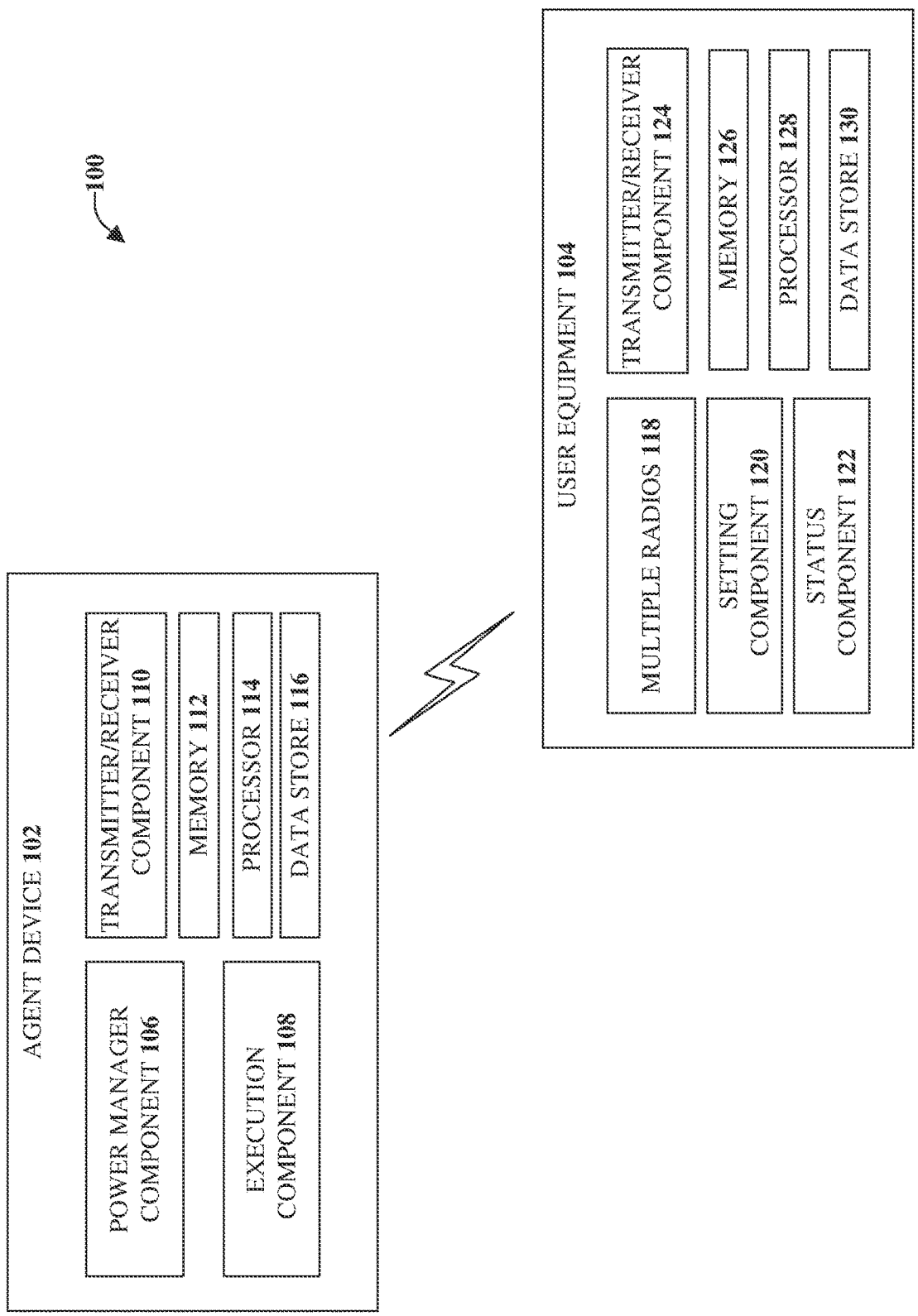
FIG. 1 illustrates an example, non-limiting, system that facilitates real-time power optimization in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate real-time power optimization in advanced networks. For example, wireless network nodes and devices are equipped with multiple radios and antenna elements to provide various wireless services, such as GSM, UMTS, LTE, 5G, 6G, Wi-Fi, and so on. There are maximum power constraints allowed for all radios or each individual radio on a User Equipment (UE). The ecosystem is aware of the need to optimize distribution among radios and other Electromagnetic (EM) emitting components. Accordingly, the disclosed aspects take into account the plethora of available features and management options. Additionally, the disclosed aspects utilize the capabilities that machine learning provides in optimizing the power distribution in a real-time individualized manner. With these advanced machine learning methods, new considerations of multiple mappings to different power types (e.g., antenna, radio, application, mode, network slice, and so on) can also be simultaneously determined with the various aspects discussed herein.

In addition, traditionally, there is no predictive capability and power management schemes usually focus only on changing the power provided to different radios. More drastic steps, such as temporary shutdown, sliced time operation, and notifications to the user and network are solutions that are vacant from traditional power management strategies, which will be discussed in further detail herein.

According to an embodiment a method can include determining, by a system comprising a memory and a processor, a power distribution setting for a user equipment that includes multiple radios. The determination can be based on a historical radio power usage, a historical performance result, a current location, and an application currently executing on the user equipment. The method also can include implementing, by the system, the power distribution setting across the multiple radios of the user equipment. The first radio of the multiple radios can be a first radio type and a second radio of the multiple radios can be a second radio type, different from the first radio type.

According to some implementations, prior to implementing the power distribution setting, the method can include selecting, by the system, the power distribution setting from a group of power distribution settings based on a determination that the power distribution setting satisfies a defined power limit and reduces an amount of electromagnetic exposure to a user. For example, the selection can include facilitating an emission of a defined amount of power in a defined time quantile.

In some implementations, determining the power distribution setting can include aggregating performance information based on the application determined to be executing on the user equipment. According to some implementations, determining the power distribution setting can include aggregating performance information based on an environmental context of the user equipment. In accordance with some implementations, determining the power distribution setting can be based on a location of the user equipment in relation to network equipment.

The method can include, according to some implementations, training, by the system, a model on the historical radio power usage and associated performance results for the first user equipment to detect the first power distribution setting across the multiple radios with a defined confidence level. Further to these implementations, the method can include applying, by the system, the model to identify at least a second power distribution setting for at least a second user equipment based on the defined confidence level. The second power distribution setting can be applied across a group of radios of the second user equipment. Further to these implementations, the first user equipment and the second user equipment can be determined to be located in a defined geographic area. The defined geographic area can be an area in which the first user equipment and the second user equipment are operated according to a fifth generation communications protocol. In another example, the first user equipment and the second user equipment can be determined to be a same device category. Further, the first user equipment and the second user equipment can be fifth generation devices.

In some implementations, determining the power distribution setting can include applying reinforcement learning based on feedback received from the user equipment after implementing the power distribution setting across the multiple radios.

The user equipment can be classified as an internet of things device. Further, determining the power distribution setting can include aggregating statistics and power output from the user equipment and a neighboring device and collaborating with the neighboring device to achieve a defined performance level based on a policy applied to the user equipment and the neighboring device. The collaboration can include sharing the power distribution setting across radios of the user equipment and the neighboring device.

Another embodiment provided herein relates to a system that can include a processor and a memory that stores executable instructions that, when executed by the processor, facilitate performance of operations. The operations can include determining a power distribution setting for a mobile device that includes multiple radios based on an analysis of historical information and current information associated with the mobile device. Further, the operations can include configuring the mobile device with the power distribution setting applied across the multiple radios of the mobile device. The power distribution setting can be configurable based on changing conditions at the mobile device.

In an example, prior to determining the power distribution setting, the operations can include ascertaining a power limit assigned to the mobile device and an amount of electromagnetic exposure caused by the mobile device. Further to this example, the operations can include configuring the power distribution setting based on retaining the amount of electromagnetic exposure below an acceptable amount of electromagnetic exposure over a defined period of time.

According to some implementations, determining the power distribution setting can include applying reinforcement learning based on feedback received from the mobile device after configuring the mobile device with the power distribution setting.

In some implementations, the operations can include training a model to detect a first power distribution setting across the multiple radios with a defined confidence level based on the historical information and current information of the first mobile device. Further to these implementations, the operations can include using the model to identify at least a second power distribution setting for at least a second mobile device based on the defined confidence level. The second power distribution setting can be applied across a group of radios of the second mobile device.

The operations can include, according to some implementations, aggregating statistics and power output from the first mobile device and a second mobile device. The first mobile device and the second mobile device can be determined to be collaborating devices. Further, the operations can include sharing the power distribution setting across radios of the first mobile device and the second mobile device based on a defined performance level determined from a policy applied to the first mobile device and the second mobile device.

Another embodiment provided herein is a non-transitory machine-readable medium, comprising executable instructions that, when executed by a processor, facilitate performance of operations. The operations can include defining a power distribution setting for a device. The power distribution setting can satisfy a defined power limit and reduces an amount of electromagnetic exposure caused by the device and is based on operation statistics of the device. Further, the operations can include applying the power distribution setting across a group of radios of the device, wherein radios of the group of radios include respective operation modes.

In some implementations, the operations can include determining a second power distribution setting for the device based on an expected cost associated with the first power distribution setting. Further, the operations can include applying the second power distribution setting across the group of radios of the device based on a determination that a cost to the device satisfies the expected cost.

The operations can include, according to some implementations, coordinating the first power distribution setting with a second power distribution setting of a second device. The coordination can include reducing overlapping noise caused by a first radio of the first device and a second radio of the second device. The first radio and the second radio can operate with a power that satisfies a defined power level.

FIG. 1 illustrates an example, non-limiting, system 100 that facilitates real-time power optimization in accordance with one or more embodiments described herein. The system 100 can include agent device 102 and a user equipment (UE 104) that can communicate with one another and/or with other UEs, other agent devices, network equipment, and so on. The communication can occur within a communications network and/or across multiple communications networks. For example, the communications network can be a network in which the UE 104 and/or other UEs can be fifth generation devices that are operated according to a fifth generation communications protocol.

Although a single agent device and a single UE are illustrated, according to various implementations, more than one agent device and/or more than one UE can be included in the system 100.

Aspects of systems (e.g., the system 100 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the agent device 102 and/or the UE 104 can be any type of component, machine, device, facility, apparatus, and/or instrument that includes a processor and/or can be capable of effective and/or operative communication with a wired and/or wireless network. Components, machines, apparatuses, devices, facilities, and/or instrumentalities that can include the agent device 102 and/or the UE 104 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 1, the agent device 102 can include a power manager component 106, an execution component 108, a transmitter/receiver component 110, at least one memory 112, at least one processor 114, and at least one data store 116. The UE 104 can include one or more radios, referred to herein as multiple radios 118, a setting component 120, a status component 122, a transmitter/receiver component 124, at least one memory 126, at least one processor 128, and at least one data store 130. The multiple radios 118 can have respective operation modes. For example, a first radio can have a first operation mode, a second radio can have a second operation mode, a third radio can have a third operation mode, and so on. As an example, a UE could utilize multiple Radio Frequency (RF) radios that operate simultaneously (e.g., a 5G mmWave frequency band and LTE frequency bands operate at the same time for non-standalone 5G deployment).

The power manager component 106 can determine a power distribution setting for the UE 104. According to some implementations, power usage savings can be realized for both the UE and a communications network (e.g., other UEs, network equipment, and so on) through joint optimization. In an example, joint optimization can include cross-network sharing of optimization to provide a consistent level of performance determined for and shared with proximal network neighbors (e.g., the other UEs, the network equipment, and so on). Thus, instead of independently performing optimization at the UE, the overall network can be optimized as discussed herein.

The power distribution setting determined by the power manager component 106 can include performing an analysis of historical information and current information associated with the UE 104. The historical information and/or current information can include power setting information, location information, location condition information, device parameter information, network parameter information, applications executing on the UE 104, and so on.

The historical information can be retained in, for example, the at least one data store 130 of the UE 104 and can be sent to the agent device 102 periodically, randomly, based on a request for the information, upon power up or initialization, and so on. According to some implementations, the historical information can be retained, at least partially, in the at least one data store 116 of the agent device 102. In some implementations, the historical information can be retained in both the at least one data store 130 of the UE 104 and the at least one data store 116 of the agent device 102. In additional, or alternative, implementations, the historical information can be retained by network equipment.

The current information can be determined by the status component 122 and can be sent to the agent device 102. For example, the current information can be sent about the same time as a change has been detected, periodically, randomly, based on a request for the information, upon power up or initialization, and so on. According to some implementations, the current information can be transmitted by the transmitter/receiver component 124 with other information that is sent to the agent device 102.

Based, at least in part, on the analysis of the historical information and current information, the execution component 108 can configure the UE 104 with the power distribution setting determined by the power manager component 106, which can be implemented on the UE 104 via the setting component 120. The power distribution setting can be configured based on changing conditions at the UE 104. Accordingly, if the status component 122 provides an indication that a condition has changed, the power manager component 106 can determine the impact of the change. If the change has an impact that satisfies a defined threshold change level, the power manager component 106 can change the power distribution setting. However, if the impact caused by the change does not satisfy the defined threshold change level, the power manager component 106 can determine that the power distribution setting should remain the same, at least for a defined period of time or until another change is indicated by the status component 122.

As it relates to a change, the usage (e.g., applications executing on the UE) can be profiled and a change in usage can indicate a change to the power distribution setting. For example, a voice communication is occurring via a first channel and then a video or gaming is requested, or is occurring, over a second channel. In this case it can be determined that the first channel can operate with low bandwidth and, thus, the bandwidth of the first channel can be reduced. In this example, lower bandwidth can be achieved by less frequent uses of one or more communication radios (e.g., the multiple radios 118), burst- or group-based data payloads through the transmitter/receiver component 124, or other mechanisms that result in a reduced usage of power by the power manager component 106. Further, the bandwidth of the second channel can be boosted so that the signal(s) can reach further, have a higher capacity, and so on, such that the experience at the UE is improved.

Figure 2:
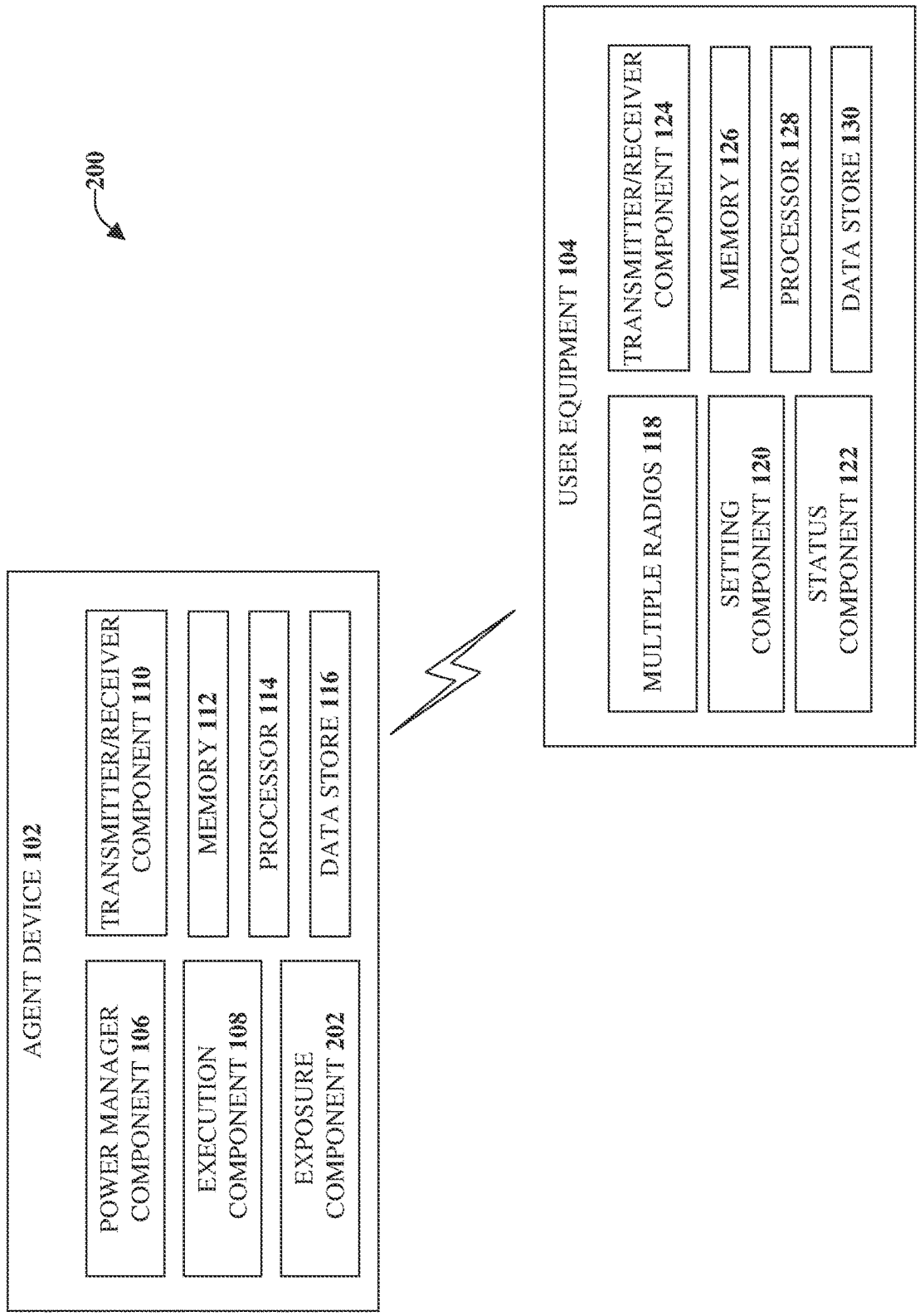
FIG. 2 illustrates an example, non-limiting, system that facilitates real-time power optimization while limiting an amount of electromagnetic exposure in accordance with one or more embodiments described herein.

FIG. 2 illustrates an example, non-limiting, system 200 that facilitates real-time power optimization while limiting an amount of electromagnetic exposure in accordance with one or more embodiments described herein. Repetitive description of like elements employed in other embodiments described herein is omitted for sake of brevity. The system 200 can include one or more of the components and/or functionality of the system 100, and vice versa.

The agent device 102 can include an exposure component 202 that can ascertain an amount of electromagnetic exposure caused by the UE 104. For example, the amount of electromagnetic exposure can be based on an actual measurement (e.g., measured at the UE 104). Alternatively, or additionally, the amount of electromagnetic exposure can be determined based on a mapping between a power setting of the UE and the expected amount of electromagnetic exposure (e.g., based on prior testing and measurements conducted on the same UE or on different UEs).

The power manager component 106 can configure the power distribution setting based on retaining the amount of electromagnetic exposure below an acceptable amount of electromagnetic exposure over a defined period of time. For example, it can be desirable to operate with the maximum amount of power allowed (e.g., by the Federal Communications Commission (FCC)) while optimizing the power distribution among radios.

According to some implementations, the power manager component 106 can reduce or mitigate electromagnetic exposure for each user and/or UE situation. Thus, the power manager component 106 can define the power distribution setting for the UE 104 based on the power distribution setting satisfying a defined power limit and reducing an amount of electromagnetic exposure caused by the device and is based on operation statistics of the device. For example, the power manager component 106 can select the power distribution setting from a group of power distribution settings. The selected power distribution setting can be the setting determined to satisfy the defined power limit while reducing the amount of electromagnetic exposure.

The transmitter/receiver component 110 can receive, from the UE 104 the historical information, the current information, the status, and other information. Further, the transmitter/receiver component 110 can send to the UE 104 the power distribution setting as well as other configurations and/or information.

The at least one memory 112 can be operatively connected to the at least one processor 114. The at least one memory 112 can store executable instructions that, when executed by the at least one processor 114 can facilitate performance of operations. Further, the at least one processor 114 can be utilized to execute computer executable components stored in the at least one memory 112.

For example, the at least one memory 112 can store protocols associated with facilitating real-time power optimization in an advanced network as discussed herein. Further, the at least one memory 112 can facilitate action to control communication between the UE 104, the agent device 102, one or more other network equipment, one or more other UEs, and so on, such that the agent device 102 can employ stored protocols and/or algorithms to facilitate real-time power optimization in advanced networks as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to include, without being limited to, these and other suitable types of memory.

The at least one processor 114 can facilitate respective analysis of information related to real-time power optimization in advanced networks. The at least one processor 114 can be a processor dedicated to analyzing and/or generating information received, a processor that controls one or more components of the agent device 102, and/or a processor that both analyzes and generates information received and controls one or more components of the agent device 102.

Further, the term network equipment is used herein to refer to any type of network node serving UE and/or connected to other network equipment, network nodes, network elements, or another network node from which the UEs can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also include multiple antennas for performing various transmission operations (e.g., MIMO operations). A network node can include a cabinet and other protected enclosures, an antenna mast, and actual antennas. Network nodes can serve several cells, also called sectors, depending on the configuration and type of antenna. Examples of network nodes can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

In addition, the transmitter/receiver component 124 can receive, from the agent device 102 one or more power distribution settings, other settings, other configurations, and/or information. Further, the transmitter/receiver component 124 can send to the agent device 102 historical information, current information, condition information, and/or other information.

The at least one memory 126 can be operatively connected to the at least one processor 128. The at least one memory 126 can store executable instructions that, when executed by the at least one processor 128 can facilitate performance of operations. Further, the at least one processor 128 can be utilized to execute computer executable components stored in the at least one memory 126.

For example, the at least one memory 126 can store protocols associated with facilitating real-time power optimization in an advanced network as discussed herein. Further, the at least one memory 126 can facilitate action to control communication between the agent device 102, the UE 104, one or more other network equipment, one or more other UEs, and so on, such that the UE 104 can employ stored protocols and/or algorithms to facilitate real-time power optimization in advanced networks as described herein.

The at least one processor 128 can facilitate respective analysis of information related to real-time power optimization in advanced networks. The at least one processor 128 can be a processor dedicated to analyzing and/or generating information received, a processor that controls one or more components of the UE 104, and/or a processor that both analyzes and generates information received and controls one or more components of the UE 104.

Figure 3:
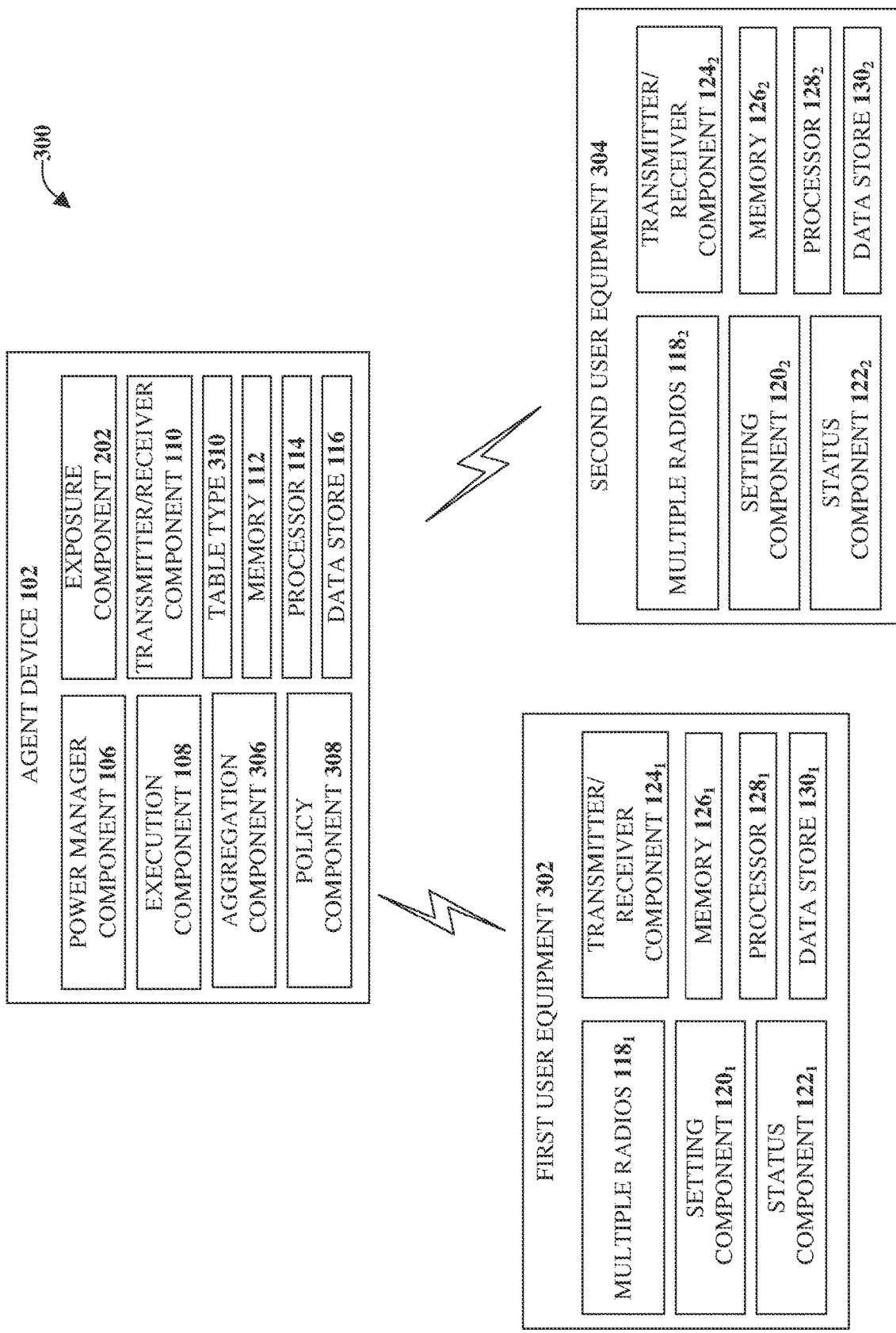
FIG. 3 illustrates an example, non-limiting, system that facilitates real-time power optimization for multiple user equipment in accordance with one or more embodiments described herein.

FIG. 3 illustrates an example, non-limiting, system 300 that facilitates real-time power optimization for multiple user equipment in accordance with one or more embodiments described herein. Repetitive description of like elements employed in other embodiments described herein is omitted for sake of brevity. The system 300 can include one or more of the components and/or functionality of the system 100, the system 200, and vice versa.

As illustrated the system 300 can include a first UE 302 and a second UE 304. The first UE 302 and the second UE 304 can include one or more of the components and/or functionality of the UE 104, denoted with subscript 1 for the first UE 302 and subscript 2 for the second UE 304. The first UE 302 and the second UE 304 can be collaborating devices. Further the first UE 302 and the second UE 304 can operate according to a fifth generation communications protocol, a sixth generation network communications protocol, or another advanced communications protocol.

The agent device 102 can include an aggregation component 306 that can aggregate one or more statistics and/or one or more power outputs from the first UE 302 and the second UE 304.

Based on the aggregated statistics and/or power outputs, the power manager component 106 can share the power distribution setting across radios (e.g., the multiple radios $118_1$ of the first UE 302 and the multiple radios $118_2$ of the second UE 304. To share the power distribution setting, the power manager component 106 can access a policy component 308 that can indicate one or more policies and/or one or more rules associated with power settings of the UEs.

According to some implementations, the power manager component 106 can coordinate a first power distribution setting of the first UE 302 with a second power distribution setting of the second UE 304. To coordinate the power distribution setting, the power manager component 106 can reduce overlapping noise caused by a first radio of the first UE 302 and a second radio of the second UE 304. The first radio and the second radio can operate with a power that satisfies a defined power level.

In some implementations, the disclosed aspects can be applied to other cost functions shared by the UE and network equipment. Such cost functions can include, but are not limited to, bandwidth utilization or latency. A type table 310 or type data store can be utilized, wherein each type in the type table 310 can represent a component or element on the UE and/or an application installed on and/or executing on the UE. As illustrated, the type table 310 can be included, at least partially, in the agent device 102. However, according to some additional, or alternative, implementations, the type table 310 can be located remote from, and accessible by, the agent device 102. Additionally, or alternatively, the type table 310 can be included, at least partially, on the user equipment.

Further, the disclosed aspects can be facilitated by the inclusion of other power usage needs for network-side operations. Examples of power usage needs can include, but are not limited to, dormant hours and power usage across different spectra.

Additionally, the disclosed aspects can be propagated as individual optimizers for specific 5G networks slices. This can include advanced power management as another component and/or Service Level Agreement (SLA) of slice definition.

There can also be a contextual switch of a type table (e.g., the type table 310) for user-specific exposure levels. For example, there can a first level for children and a second level for adults, although more than two levels can be utilized with the disclosed aspects. The contextual switch for the specific exposure levels based on pre-determined power limitations, for example.

Additional propagation and cooperative sharing of type tables among neighboring network nodes can also be utilized with the disclosed aspects. The propagation and cooperative sharing can assist with keeping a steady optimizer state for a specific UE, which can be in transit or after a dormant period.

Further, the disclosed aspects can coordinate multiple UEs for signal optimization and/or QoS optimization with respect to reducing overlapping noise by high-power operation in specific radio type.

Figure 4:
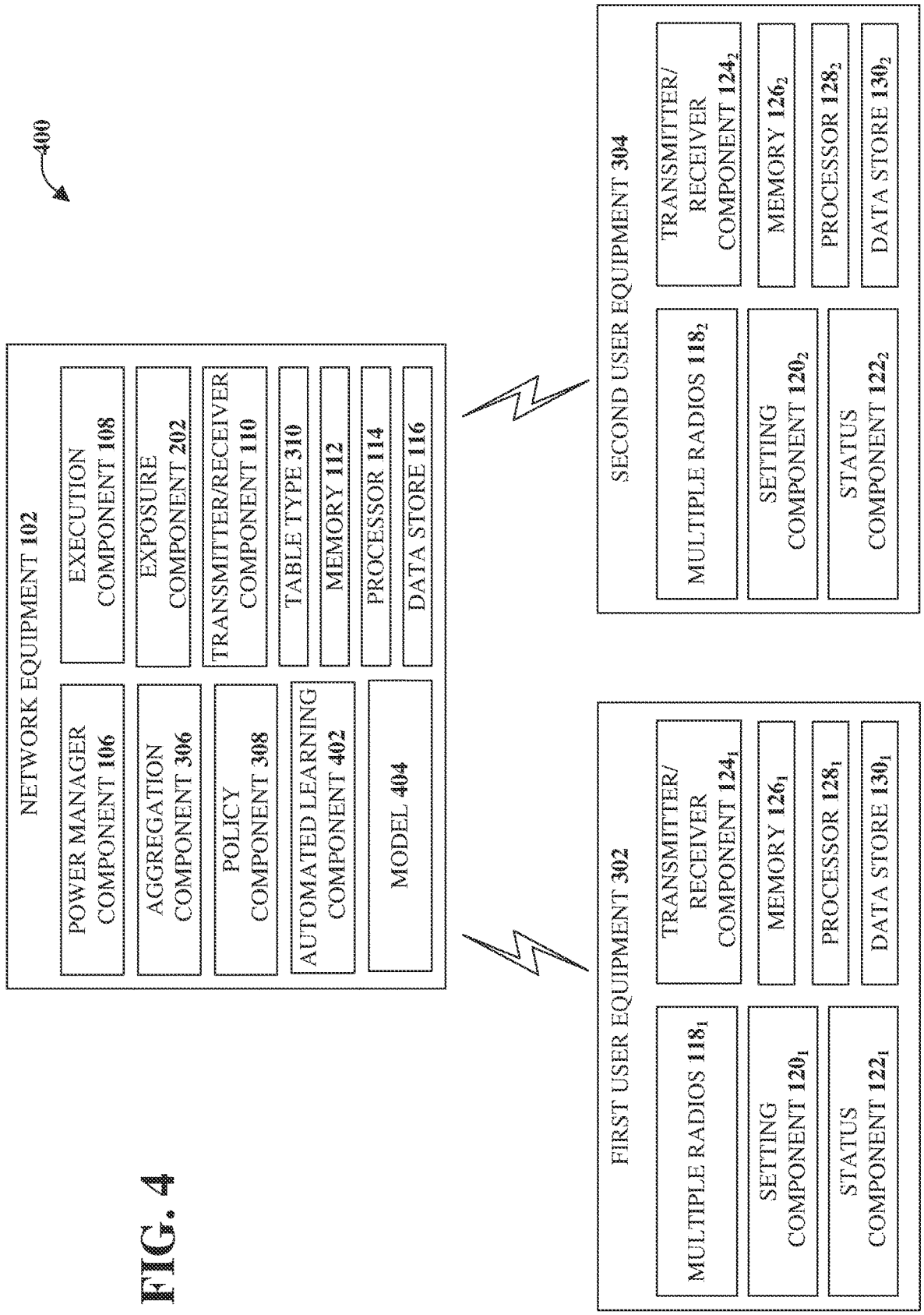
FIG. 4 illustrates an example, non-limiting, system that employs automated learning to facilitate one or more of the disclosed aspects in accordance with one or more embodiments described herein.

FIG. 4 illustrates an example, non-limiting, system 400 that employs automated learning to facilitate one or more of the disclosed aspects in accordance with one or more embodiments described herein. Repetitive description of like elements employed in other embodiments described herein is omitted for sake of brevity. The system 400 can include one or more of the components and/or functionality of the system 100, the system 200, the system 300, and vice versa.

The system 400 can include an automated learning component 402 that can be utilized to automate one or more of the disclosed aspects. The automated learning component 402 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the automated learning component 402 can employ principles of probabilistic and decision theoretic inference. Additionally, or alternatively, the automated learning component 402 can rely on predictive models constructed using machine learning and/or automated learning procedures. Logic-centric inference can also be employed separately or in conjunction with probabilistic methods.

The automated learning component 402, according to some implementations, can apply reinforcement learning based on feedback received from a mobile device (e.g., the UE 104, the first UE 302, the second UE 304) after configuring the mobile device with the power distribution setting.

According to some implementations, the automated learning component 402 can train a model 404 to detect a first power distribution setting across the multiple radios (e.g., the multiple radios $118_1$) with a defined confidence level based on the historical information and current information of the first UE 302. Further, the power manager component 106 can use the model 404 to identify at least a second power distribution setting for at least the second UE 304 based on the defined confidence level. The second power distribution setting can be applied across a group of radios (e.g., the multiple radios $118_2$) of the second UE 304.

As used herein, the term "inference" refers generally to the process of reasoning about or inferring states of a system, a component, a module, an environment, and/or devices from a set of observations as captured through events, reports, data and/or through other forms of communication. Inference can be employed to identify a specific condition, modification, and/or effect, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with facilitating real-time power optimization in advanced networks) can employ various artificial intelligence-based schemes for carrying out various aspects thereof. For example, a process for determining power settings across multiple radios of a single device or multiple devices can be enabled as discussed herein.

A classifier is a function that maps an input attribute vector, x=(x1, x2, x3, x4, xn), to a confidence that the input belongs to a class. In other words, f(x)=confidence(class). Such classification can employ a probabilistic and/or statistical-based analysis (e.g., factoring into the analysis utilities and costs) to provide a prognosis and/or infer one or more actions that should be employed to determine what action to be automatically performed.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by retaining a database of triggers, historical changes, and impacts). For example, SVMs can be configured through a learning or training phase within a classifier constructor and feature selection module. Thus, a classifier(s) can be used to automatically learn and perform a number of functions, including but not limited to facilitating one or more power distribution setting and monitoring and changing the power distribution settings over time in advanced networks.

In further detail, the disclosed aspects use historical power and performance analysis to create an instantaneous predictor for power distribution optimization across all radios (e.g., the multiple radios 118) on the UE 104. The system 100 (as well as other embodiments provided herein) can facilitate instantaneous power distribution optimization, distributed power optimization, reinforcement learning models, and/or machine learning-based prediction.

For example, instantaneous power distribution optimization can be facilitated regardless of radio type or activation level (e.g., can be across UE radios (or types as discussed herein). The instantaneous power distribution optimization can be such that the power distributions does not exceed predetermined limits but does maximize performance on one or more radio and minimize EM exposure to human bodies. According to some implementations, the instantaneous power distribution optimization can be utilized to maximize performance with a pre-defined power limit (e.g., always red-lining performance).

For distributed power optimization, an optimizer (e.g., the power manager component 106) can rely on the UE 104 or agent device 102. For example, the distributed power optimization can be facilitated by aggregating performance information and pre-trained power impact type tables according to some implementations.

In another example, Reinforcement Learning (RL) models can be hot-swapped for UEs or locations. Based on a localized RL agent trained from history (e.g., the historical information), a model can be trained on one UE (e.g., the UE 104) and used to bootstrap other UEs. For example, the model can provide similar agency (and efficiency improvements) for other UEs. This can be applied both cross-UEs (e.g., all UEs in a location) and cross-location (e.g., all locations for a particular UE model).

Further, Machine Learning (ML)-based predictions for future power states can be determined. For example, instead of reactive power management alone, the system 100 can predict future needs to be utilized by the network equipment or the UE if compute cost is too high.

Benefits of the disclosed aspects include, but are not limited to, power savings realized by both the UE and network equipment. Another benefit is less reliance on hardware design elements, which can leave power and performance optimization to be a real-time decision with a coordinated system. A further benefit is the application of ML framework for both instant optimization of power utilization as well as future prediction of state and power needs for lower compute requirements. Yet another benefit is a unified framework to measure and maximize power devoted to specific radio (types) on a UE regardless of individual operation (e.g., multiple radios simultaneously in use or powered down as needed). Further, without specific application knowledge power utilization can be redistributed in background by optimizer, which is another benefit. Incorporation of human and/or health considerations for power management, including predictions and notifications for different states when the UE could be classified as alternate types (e.g., fixed, mobile, and so on) is another benefit realized with the disclosed aspects. In addition, another benefit going beyond power management is that the agent can provide predictions (and notifications) to a network, a human operator, a non-human operator, and so on from an on-UE RL agent.

Figure 5:
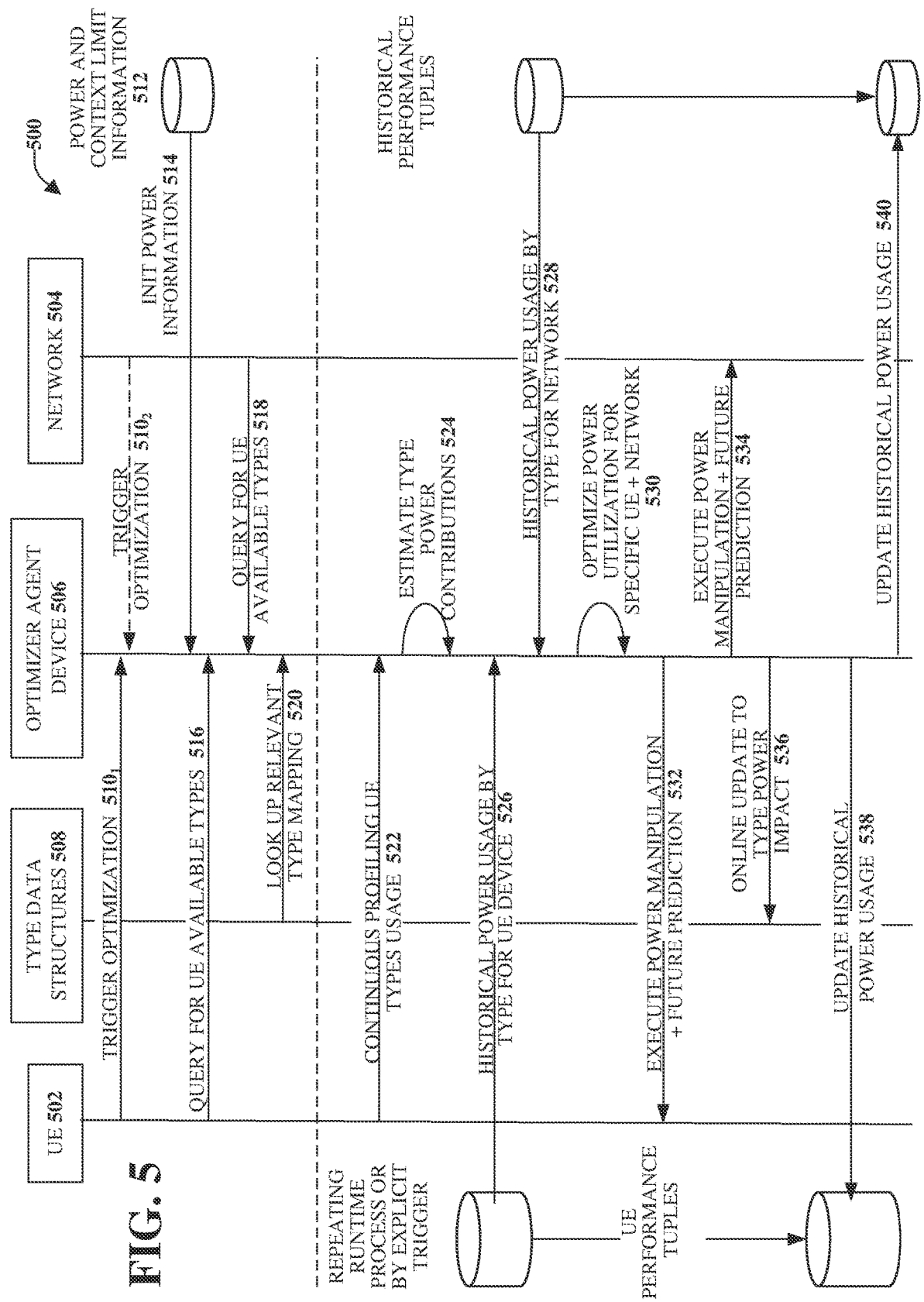
FIG. 5 illustrates an example, non-limiting, message sequence flow chart that can facilitate predictive power usage in accordance with one or more embodiments described herein.

FIG. 5 illustrates an example, non-limiting, message sequence flow chart 500 that can facilitate predictive power usage in accordance with one or more embodiments described herein. The message sequence flow chart 500 can be utilized for new radio, as discussed herein. Repetitive description of like elements employed in other embodiments described herein is omitted for sake of brevity. The message sequence flow chart 500 can include one or more of the components and/or functionality of the system 100, the system 200, the system 300, the system 400, and vice versa.

As illustrated, the message sequence flow chart 500 represents a message sequence between a UE 502 (e.g., the UE 104, the first UE 302, the second UE 304) and a network 504 (e.g., network equipment). Also included in the message sequence flow chart 500 is an optimizer agent device 506 (e.g., the agent device 102). Further, type data structures or type tables 508 (e.g., the type table 310) can be utilized with the message sequence flow chart 500. It should be noted, that according to some implementations, only a portion of the message sequence flow chart 500 is needed and, therefore, one or more steps of the message sequence flow chart 500 can be bypassed or skipped.

According to some implementations, the optimizer agent device 506 (as well as other agent devices discussed herein) can be included, at least partially, in the UE 502. Alternatively, or additionally, the optimizer agent device 506 can be included, at least partially, in the network 504. As used herein, the term "network device" can be interchangeable with (or can include) a network, network equipment, a network controller or any number of other network components.

Although illustrated as a single UE, the disclosed aspects can be applied to an implementation that can include multiple UEs that are in communication with the optimizer agent device 506 and/or the network 504. Accordingly, although illustrated with respect to a single UE the disclosed aspects can be applied to more than one UE at substantially the same time. Alternatively, or additionally, one or more optimizer agent devices and/or network devices can be utilized with the disclosed aspects.

The optimizer agent device 506 and/or the type tables 508 can be located on (e.g., stored in one or more memories and/or one or more data stores) of the UE 502, the network 504, both the UE 502 and the network 504, or located separate from the UE 502 and/or the network 504.

The UE 502 can be equipped with multiple radios (e.g., the multiple radios 118). As indicated at $510_1$ and $510_2$, optimization (advanced power management) as discussed herein can be triggered or enabled by one or more entities. As utilized herein an entity can be one or more computers, the Internet, one or more systems, one or more commercial enterprises, one or more computers, one or more computer programs, one or more equipment, one or more machines, machinery, one or more actors, one or more users, one or more customers, one or more humans, and so forth, hereinafter referred to as an entity or entities depending on the context.

For example, the advanced power management can be enabled by the UE 502, as indicated at $510_1$. Such enablement by the UE 502 can be performed automatically and/or based on one or more inputs. For example, the UE 502 can determine that it needs power and can automatically enable the advanced power management. According to an implementation, the advanced power management can be initiated manually by a user (e.g., facilitate installation and activation of an application on the device). In some cases, the advanced power management can be initialized when the UE is powered on.

In another implementation, the advanced power management can be facilitated automatically by the network (e.g., the network 504), as indicated at $510_2$. For example, the network equipment can balance the UEs located within one or more communications networks and can utilize the advanced power management application to facilitate such balancing. In an optional implementation, automation from any entity can suggest low power usage from idle time or trigger (e.g., location change, user interaction, and so on).

According to some implementations, power and context limit information 512 can be provided to the optimizer agent device 506, such as during an initial power information 514 exchange or at a different time. Queries for UE available types, at 516 and 518 can be performed. Further, creation and population of multiple look-up tables can be performed at 520. For example, the creation and population of multiple look-up tables can include one or more type tables that operate to map to power cost, collection and aggregation strategies against type. Optionally, real-time updates can be supplied with UE and specific type tuples.

According to a non-limiting example, "type" tables can operate to map to power cost. In an implementation, the type table can be an application-power lookup table (e.g., power utility by application). In an additional, or alternative, implementation, the type table can be a spectra power usage table (e.g., power utility by spectra). According to an additional, or alternative, implementation, the type table can be based on UE mode. In accordance with an additional, or alternative implementation, the type table can be a 5G slice mode or parameterization.

Continuous profiling UE types usage can be performed at 522. For example, this can include repeating runtime process and/or by an explicit trigger. Estimate type power contributions can be determined at 524. Further, historical power usage by type for the UE can be collected, as indicated at 526 and 528.

According to another non-limiting example, there can be collection and aggregation strategies against "type" tables. According to an implementation, profiling builds statistics for radio operation and utility in a sandbox or test environment ideally (e.g., one type). In an optional implementation, observations not in sandbox can be collected for different permutations to determine overlapping set of app users (e.g., multiple type, multiple radio and so on. Further, using signal separation, estimate specific type contributions to power usage by radio for projection/table creation. Optionally, a resource cost (financial or other) can be attributed to this power usage table (for network operation optimization).

A system (running on the UE 502 or the network 504) can apply type tables for power estimates. Computation can utilize both runtime type data as well as historical data for prediction of power usage. Optionally, historical data can be from specific user/UE or from aggregated device type usage. Further, from either fixed or UE-profile based cost functions (e.g., priority for any type operation), run optimization to determine which radio power should be manipulated. Accordingly, power utilization for a defined UE and network can be optimized at 530.

As indicated at 532 and 534, the system can execute new power level modifications from optimization. Optionally, the system can provide prediction for multiple time steps in the future such that UE can better plan "power down" for specific radio.

Trigger for power estimates can be received from the UE. The trigger can be based on regular frequency and/or regular timer. The trigger can be based on instantaneous limits for power level. Alternatively, or additionally, the trigger can be based on a change in user state (e.g., mobile, location, and so on). According to some implementations, the trigger can be based on the network slice need or notification.

Post-mortem and regular updates can also be performed. In an example, online update to type power impact can be performed at 536. The UE usage profile can be locally updated. Optionally, the network equipment receives power management signals. Optionally, all look-up tables can be updated with power mapping estimates. Thus, the historical power usage can be updated at 538 and 540.

Figure 6:
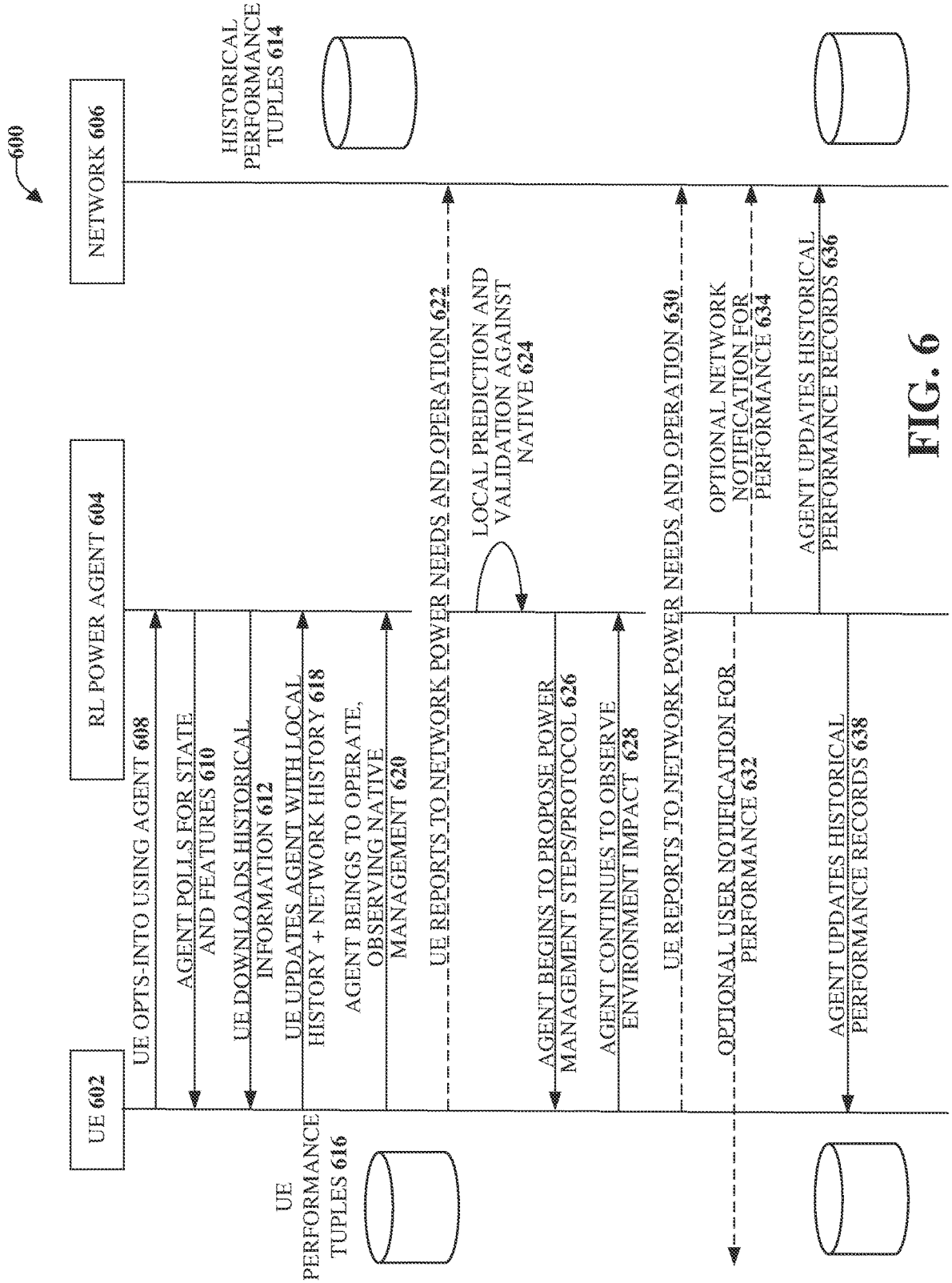
FIG. 6 illustrates an example, non-limiting, message sequence flow chart for a reinforcement learning agent that can facilitate predictive power usage in accordance with one or more embodiments described herein.

FIG. 6 illustrates an example, non-limiting, message sequence flow chart 600 for a reinforcement learning agent that can facilitate predictive power usage in accordance with one or more embodiments described herein. The message sequence flow chart 600 can be utilized for new radio, as discussed herein. Repetitive description of like elements employed in other embodiments described herein is omitted for sake of brevity. The message sequence flow chart 600 can include one or more of the components and/or functionality of the system 100, the system 200, the system 300, the system 400, the message sequence flow chart 500, and vice versa.

Illustrated are a UE 602 (e.g., the UE 104, the first UE 302, the second UE 304, the UE 502), a Reinforcement Learning Agent or RL agent 604 (e.g., the agent device 102), and a network 606.

As indicated at 608, the UE 602 can choose to use the RL agent 604 (also referred to as an RL power agent). The choice to use the RL agent can be similar to the invocation of the advanced power management as discussed with respect to FIG. 5.

The RL agent can po61 information for UE capabilities (all different types of radios). For example, at 610, the RL agent 604 can poll for state information in the current UE (e.g., the UE 602). The state information can include, for example, running applications (e.g., applications executing on the UE 602), mobile state, fixed state, power throughput for safety, and so on.

Further, at 612, the UE can download historical information. The historical information can include network specific information for location (e.g., prior single strength and modulation history), which is network specific. The historical information also can include UE information for similar model and performance, which is UE specific. Additionally, or alternatively, the historical information can include network and UE joint performance tuples. For example, the network and UE joint performance tuples can include network performance tuples 614, which can be retained or stored at the network 606, and UE performance tuples 616, which can be retained or stored at the UE 602. According to some implementations, the network and UE joint performance tuples can include UE plus network fidelity at different power levels and/or UE plus network error at different power levels.

The UE 602 can collect local usage information. At 618, the UE 602 can update the RL agent 604 with the local usage information and the network history. The RL agent 604 can begin to operate at 620. For example, the RL agent 604 can use local features for instant decision and can use the history for satisfactory peer ranges. According to some implementations, the UE 602 can report to the network 606 power needs and operations, at 622.

If starting from scratch (e.g., no historical information available), as indicated between the horizontal dashed lines, the RL agent 604 can allow a native power management mechanism to "teach" the RL agent 604 proper intervals. As the RL agent 604 learns (e.g., via automated learning as discussed herein), the RL agent 604 can validate predictions against known management processes, at indicated at 624. Then, the RL agent 604 can begin to take over common power situations. For example, the RL agent 604 can begin to propose power management steps and/or management protocols, at 626. Further, the RL agent 604 can continue to observe environment impact, at 628. The UE can report to the network power needs and operation, at 630. Finally, the RL agent 604 retains full control from native operations. Next, the RL agent 604 can predict what the next action should be and can retain the predication locally and/or optionally transmit the prediction to the network 606. Optionally, if the prediction is not performed due to power resource limits, for example, the RL agent 604 can fall back to the above prediction (e.g., using local features for the instant prediction).

According to some implementations, the RL agent 604 actions can be realized as, for example, turning on and/or off power to a specific radio, changing a power amount to a specific radio, varying step size for a power amount change. Additionally, or alternatively, other actions realized by the RL agent 604 can include an optional notification to the user, at 632, for better signal with different orientation and/or request to the network 606 for alternate beam-forming strategy for temporary state.

Other actions can alternatively, or additionally, include the UE proposing alternate slice configuration in advanced 5G protocol for relaxed throughput or latency requirements and/or optionally, proposing changing between "fixed" and "wireless" classification based on non-movement and health validation. Optionally, the network can be notified for performance, at 634.

History and predictions can be archived locally, to the network 606, at 636, and generalized model (both concurrently and post-mortem operation). The UE 602 can also be updated with historical performance records, at 638. For example, the RL agent 604 can provide updated snapshots of model for similar UEs to utilize in location or similar environment. In another example, history and prediction can be utilized in a secondary learning for additional model proposals by the network 606 and/or the UE 602 (going beyond agent operation for better overall power or signal attenuation).

Methods that can be implemented in accordance with the disclosed subject matter will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 7:
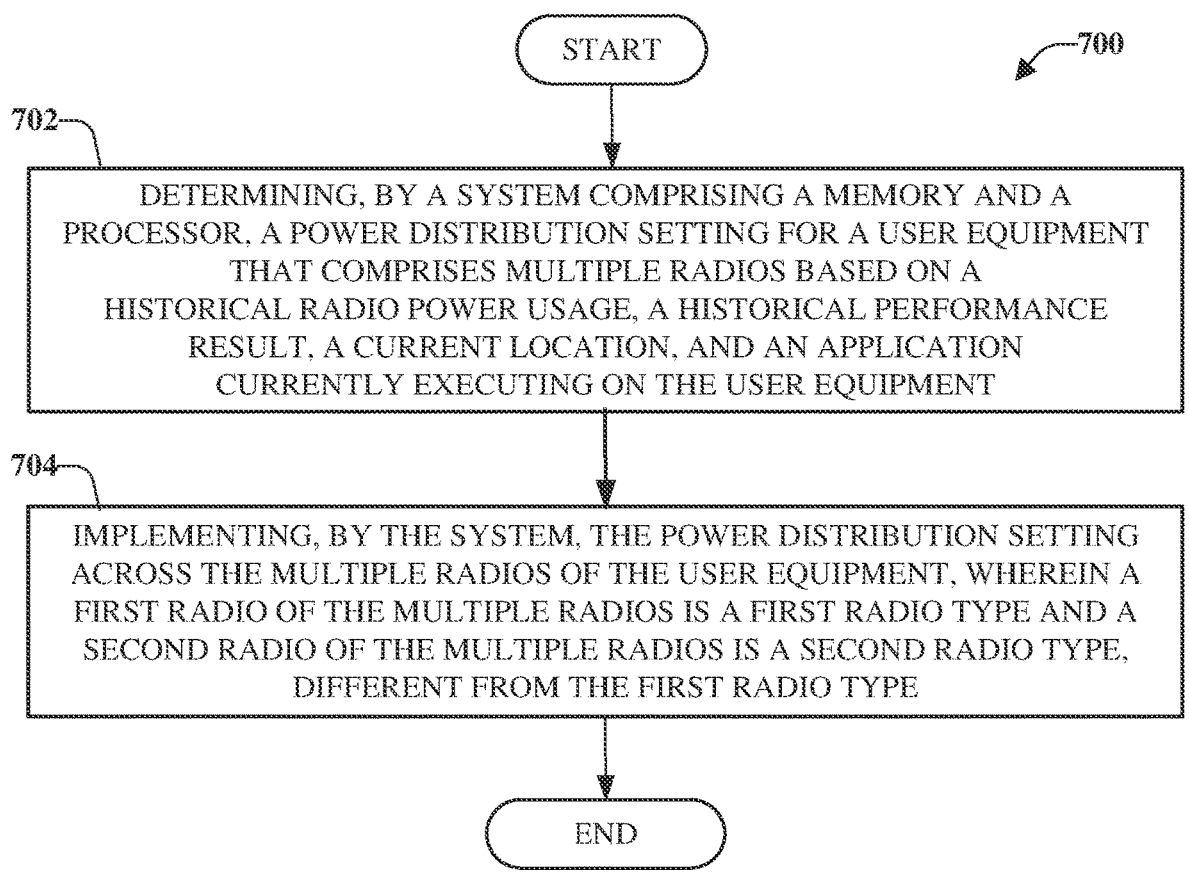
FIG. 7 illustrates a flow diagram of an example, non-limiting, computer-implemented method for facilitating power optimization across radios and antenna elements of a device in advanced networks in accordance with one or more embodiments described herein.

FIG. 7 illustrates a flow diagram of an example, non-limiting, computer-implemented method 700 for facilitating power optimization across radios and antenna elements of a device in advanced networks in accordance with one or more embodiments described herein. Repetitive description of like elements employed in other embodiments described herein is omitted for sake of brevity.

In some implementations, a system comprising a processor can perform the computer-implemented method 700 and/or other methods discussed herein. In other implementations, a device comprising a processor can perform the computer-implemented method 700 and/or other methods discussed herein. In other implementations, a machine-readable medium, can include executable instructions that, when executed by a processor, facilitate performance of operations, which can be the operations discussed with respect to the computer-implemented method 700 and/or other methods discussed herein. In further implementations, a machine readable or computer readable storage device comprising executable instructions that, in response to execution, cause a system comprising a processor to perform operations, which can be operations discussed with respect to the computer-implemented method 700 and/or other methods discussed herein. Further, in some implementations, various equipment comprising at least one processor can perform the computer-implemented method 700 and/or other methods discussed herein.

The computer-implemented method 700 starts at 702, with determining a power distribution setting for a user equipment that includes multiple radios (e.g., via the power manager component 106). The power distribution setting can be determined based on a historical radio power usage, a historical performance result, a current location, and an application currently executing on the user equipment.

At 704, the power distribution setting can be implemented across the multiple radios of the user equipment (e.g., via the execution component 108). Further, a first radio of the multiple radios can be a first radio type and a second radio of the multiple radios can be a second radio type, different from the first radio type.

According to some implementations, determining the power distribution setting can include aggregating performance information based on the application determined to be executing on the user equipment and/or based on an environmental context of the user equipment. In alternative, or additional, implementations, determining the power distribution setting can include determining the power distribution setting based on a location of the user equipment in relation to network equipment. In accordance with some implementations, determining the power distribution setting can include applying reinforcement learning based on feedback received from the user equipment after implementing the power distribution setting across the multiple radios.

Figure 8:
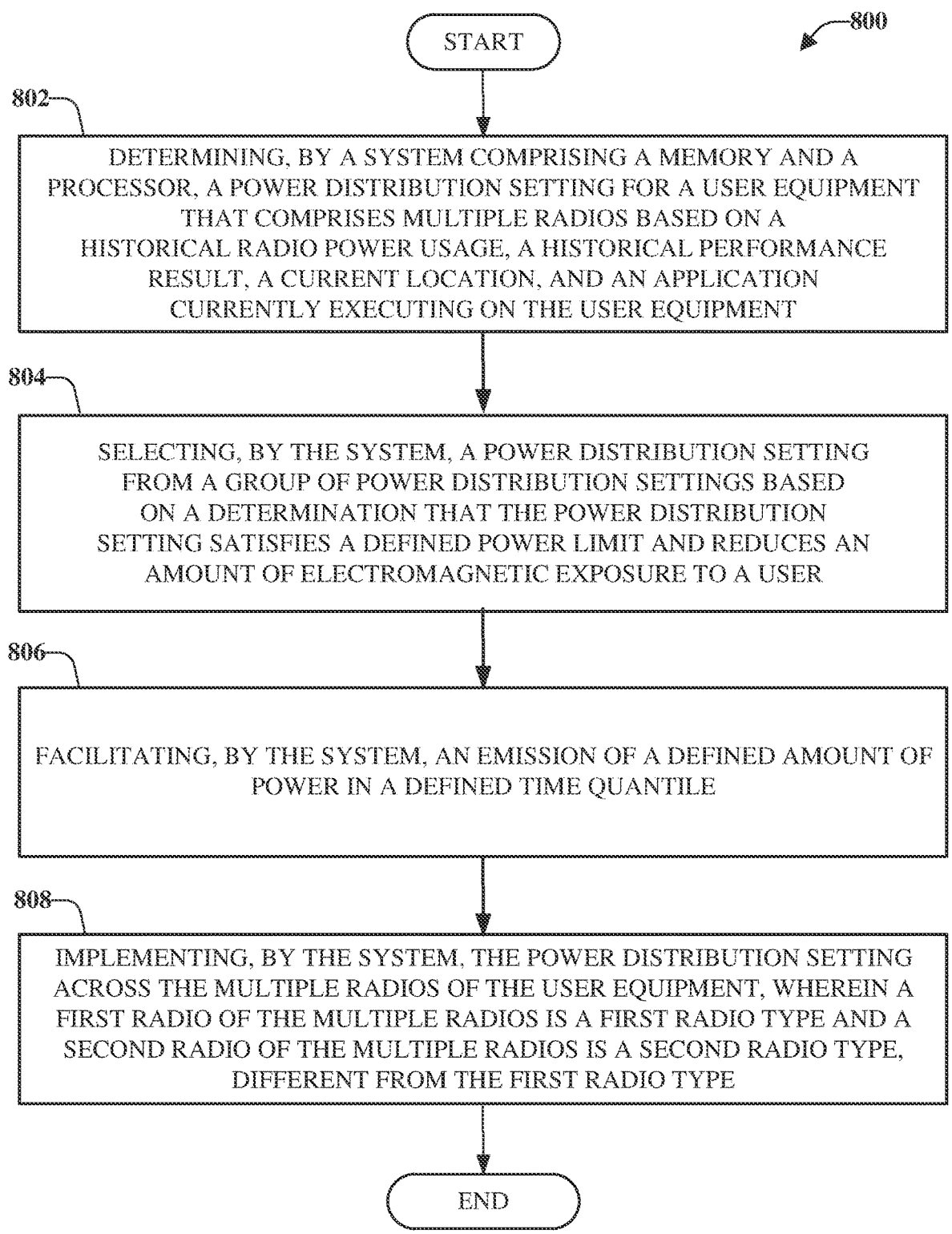
FIG. 8 illustrates a flow diagram of an example, non-limiting, computer-implemented method 800 for mitigating an amount of electromagnetic exposure while facilitating power optimization across radios and antenna elements of a device in advanced networks in accordance with one or more embodiments described herein.

FIG. 8 illustrates a flow diagram of an example, non-limiting, computer-implemented method 800 for mitigating an amount of electromagnetic exposure while facilitating power optimization across radios and antenna elements of a device in advanced networks in accordance with one or more embodiments described herein. Repetitive description of like elements employed in other embodiments described herein is omitted for sake of brevity.

At 802 of the computer-implemented method 800, a system comprising a processor can determine a power distribution setting for a user equipment (e.g., via the power manager component 106). The user equipment can include multiple radios. The power distribution setting can be determined based on a historical radio power usage, a historical performance result, a current location, and an application currently executing on the user equipment.

An appropriate power distribution setting can be selected, at 804, from a group of power distribution settings (e.g., via power manager component 106). Selection of the power distribution setting from the group can be based on a determination that the power distribution setting satisfies a defined power limit and reduces an amount of electromagnetic exposure to a user.

Further, at 806 of the computer-implemented method 800, the selection of the power distribution setting can be determined to facilitate an emission of a defined amount of power in a defined time quartile (e.g., via the exposure component 202). Further, at 808 the system can implement the power distribution setting across the multiple radios of the user equipment (e.g., via the execution component 108).

Figure 9:
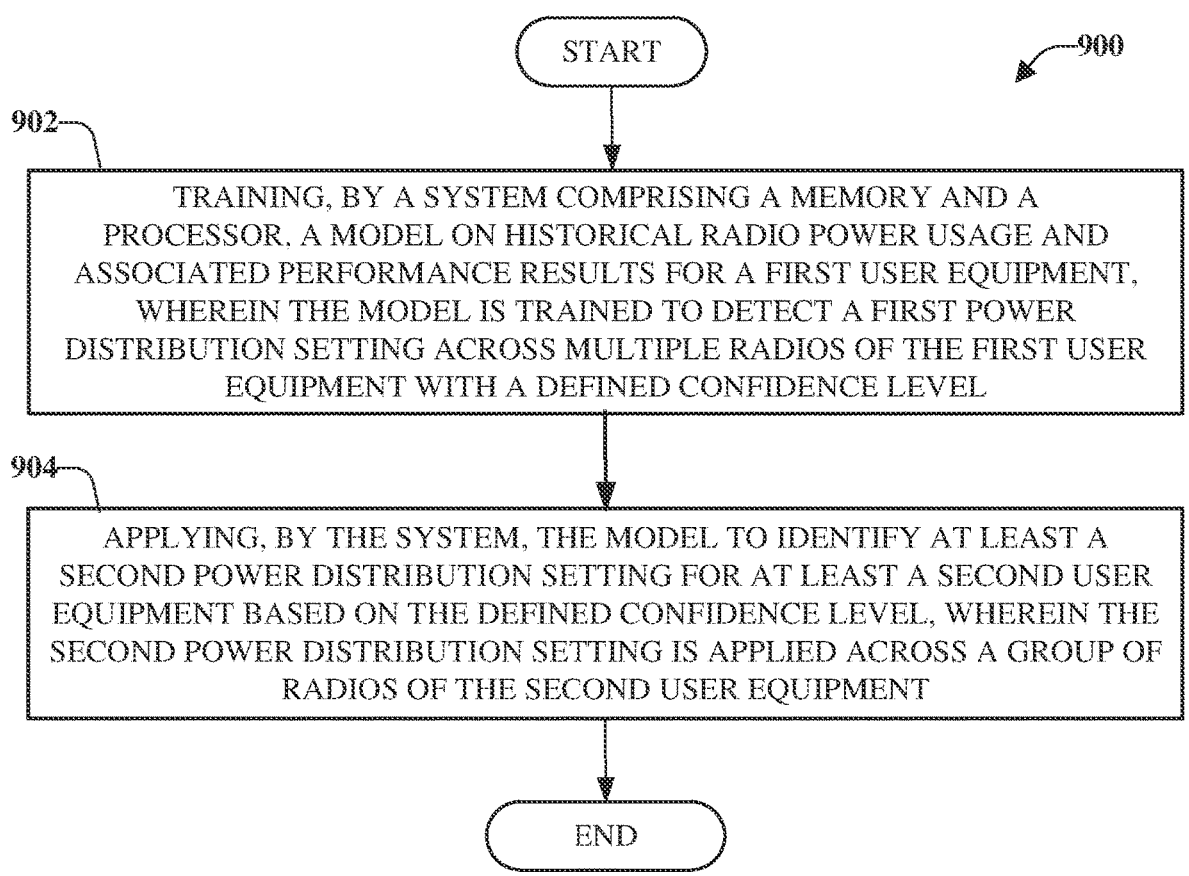
FIG. 9 illustrates a flow diagram of an example, non-limiting, computer-implemented method for training a model to facilitate power optimization across radios and antenna elements of a device in advanced networks in accordance with one or more embodiments described herein.

FIG. 9 illustrates a flow diagram of an example, non-limiting, computer-implemented method 900 for training a model to facilitate power optimization across radios and antenna elements of a device in advanced networks in accordance with one or more embodiments described herein. Repetitive description of like elements employed in other embodiments described herein is omitted for sake of brevity.

At 902 of the computer-implemented method 900, a system comprising a processor can train a model on historical radio power usage and associated performance results for a first user equipment (e.g., via the automated learning component 402). The first user equipment can include multiple radios. The model can be trained to detect the first power distribution setting across the multiple radios with a defined confidence level. According to some implementations, a first radio of the multiple radios can be a first radio type, a second radio of the multiple radios can be a second radio type, and a subsequent radio of the multiple radios can be a subsequent radio type. The first radio, the second radio, and the subsequent radios can be different radio types. However, in some implementations, at least two of the first radio, the second radio, and the subsequent radios can be a same type or a similar type.

Further, at 904, the computer-implemented method 900 can apply the model to identify at least a second power distribution setting for at least a second user equipment based on the defined confidence level (e.g., via the automated learning component 402). The second power distribution setting can be applied across a group of radios of the second user equipment.

Figure 10:
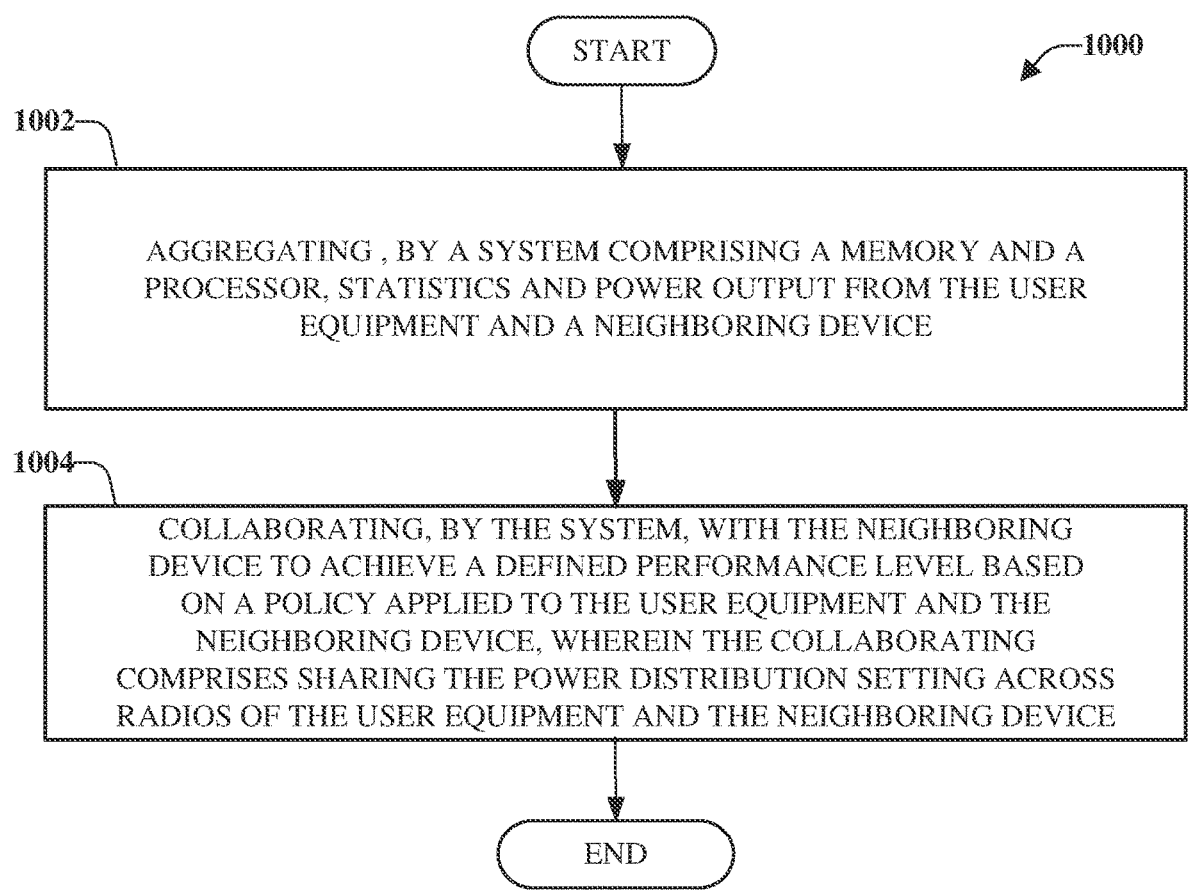
FIG. 10 illustrates a flow diagram of an example, non-limiting, computer-implemented method for collaboration among devices in advanced networks in accordance with one or more embodiments described herein.

FIG. 10 illustrates a flow diagram of an example, non-limiting, computer-implemented method 1000 for collaboration among devices in advanced networks in accordance with one or more embodiments described herein. Repetitive description of like elements employed in other embodiments described herein is omitted for sake of brevity.

At 1002 of the computer-implemented method 1000, a system comprising a processor can aggregate statistics and power output from a user equipment and a neighboring device (e.g., via the aggregation component 306). For example, the user equipment can be classified as an internet of things device.

Further, at 1004, the system can collaborate with the neighboring device to achieve a defined performance level based on a policy applied to the user equipment and the neighboring device (e.g., via the policy component 308). The collaboration can include sharing the power distribution setting across radios of the user equipment and the neighboring device.

Described herein are systems, methods, articles of manufacture, and other embodiments or implementations that can facilitate real-time power optimization in advanced networks. Facilitating real-time power optimization in advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, water meter, etc.), and/or any connected vehicles (e.g., cars, airplanes, boats, space rockets, and/or other at least partially automated vehicles (e.g., drones), and so on). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

To meet the huge demand for data centric applications, 4G standards can be applied to 5G, also called New Radio (NR) access. The 5G networks can include the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a ($N_t$, $N_r$) system, where $N_t$ denotes the number of transmit antennas and $N_r$ denotes the receive antennas, the peak data rate multiplies with a factor of $N_t$ over single antenna systems in rich scattering environment.

In addition, advanced networks, such as a 5G network can be configured to provide more bandwidth than the bandwidth available in other networks (e.g., 4G network, 5G network). A 5G network can be configured to provide more ubiquitous connectivity. In addition, more potential of applications and services, such as connected infrastructure, wearable computers, autonomous driving, seamless virtual and augmented reality, "ultra-high-fidelity" virtual reality, and so on, can be provided with 5G networks. Such applications and/or services can consume a large amount of bandwidth. For example, some applications and/or services can consume about fifty times the bandwidth of a high-definition video stream, Internet of Everything (IoE), and others. Further, various applications can have different network performance requirements (e.g., latency requirements and so on).

Cloud Radio Access Networks (cRAN) can enable the implementation of concepts such as SDN and Network Function Virtualization (NFV) in 5G networks. This disclosure can facilitate a generic channel state information framework design for a 5G network. Certain embodiments of this disclosure can include an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 11:
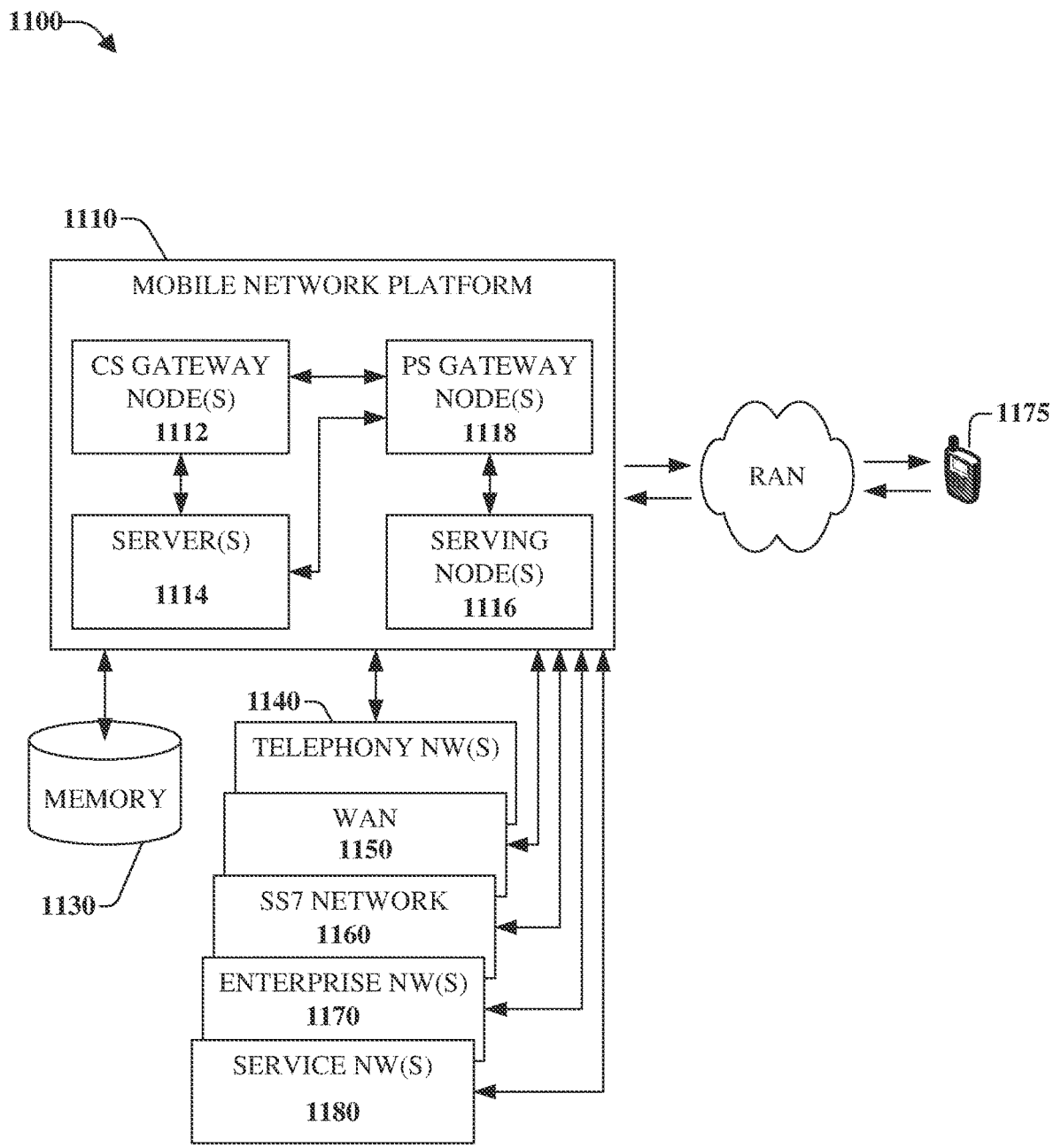
FIG. 11 illustrates an example block diagram of a non-limiting embodiment of a mobile network platform in accordance with various aspects described herein.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks such as telephony network(s) 1140 (e.g., public switched telephone network (PSTN), or public land mobile network (PLMN)) or a signaling system #7 (SS7) network 1160. Circuit switched gateway node(s) 1112 can authorize and authenticate traffic (e.g., voice) arising from such networks. Additionally, CS gateway node(s) 1112 can access mobility, or roaming, data generated through SS7 network 1160; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication. Mobile network platform 1110 can also include the MMEs, HSS/PCRFs, SGWs, and PGWs disclosed herein.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1170 can embody, at least in part, a service network(s) such as IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1175.

It is to be noted that server(s) 1114 can include one or more processors configured to confer at least in part the functionality of macro network platform 1110. To that end, the one or more processors can execute code instructions stored in memory 1130, for example. It should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless network platform 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1170, or SS7 network 1160. In an aspect, memory 1130 can be, for example, accessed as part of a data store component or as a remotely connected memory store.

Figure 12:
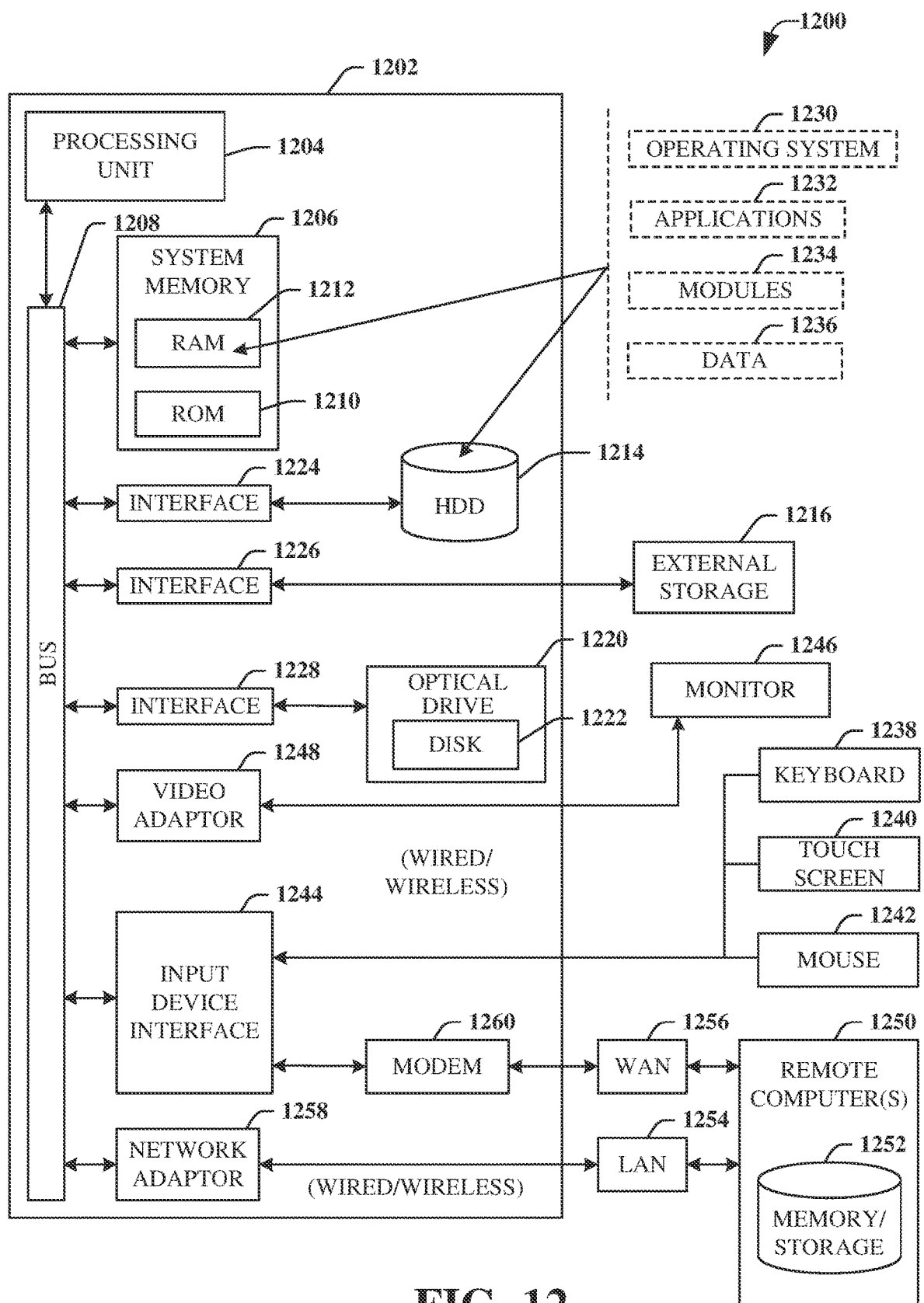
FIG. 12 illustrates an example block diagram of an example computer operable to engage in a system architecture that facilitates wireless communications according to one or more embodiments described herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an internal HDD 1214. The internal HDD 1214, external storage device(s) 1216 and optical disk drive 1220 can be connected to the system bus 1208 by an HDD interface 1224, an external storage interface 1226 and an optical drive interface 1228, respectively. The HDD interface 1224 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally include emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can include one virtual machine (VM) of multiple VMs hosted at computer 1202. Furthermore, operating system 1230 can provide runtime environments, such as the Java runtime environment or the .NET framework, for application programs 1232. Runtime environments are consistent execution environments that allow application programs 1232 to run on any operating system that includes the runtime environment. Similarly, operating system 1230 can support containers, and application programs 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1260, and a pointing device, such as a mouse 1262. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1264 that can be coupled to the system bus 1208, but can be connected by other interfaces, such as a parallel port, an IEEE 1094 serial port, a game port, a USB port, an IR interface, a BLUETOOTH® interface, etc.

A monitor 1266 or other type of display device can be also connected to the system bus 1208 via an interface, such as a video adapter 1268. In addition to the monitor 1266, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1280 or can be connected to a communications server on the WAN 1256 via other means for establishing communications over the WAN 1256, such as by way of the Internet. The modem 1280, which can be internal or external and a wired or wireless device, can be connected to the system bus 1208 via the input device interface 1264. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1280, respectively. Upon connecting the computer 1202 to an associated cloud storage system, the external storage interface 1226 can, with the aid of the adapter 1258 and/or modem 1280, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments. The term "include" can be used interchangeably with the term "comprise," or variants thereof.

As used in this disclosure, in some embodiments, the terms "component," "system," "interface," and the like are intended to refer to, or include, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, Wireless Fidelity (Wi-Fi), Global System For Mobile Communications (GSM), Universal Mobile Telecommunications System (UMTS), Worldwide Interoperability For Microwave Access (WiMAX), enhanced General Packet Radio Service (enhanced GPRS), Third Generation Partnership Project (3GPP) long term evolution (LTE), Third Generation Partnership Project 2 (3GPP2) Ultra Mobile Broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can include, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    aggregating, by a system comprising a processor, first statistics and first information indicative of a first power output from a first device and second statistics and second information indicative of a second power output from a second device, wherein the first device and the second device are determined to be collaborating devices; and
    sharing, by the system, a power distribution setting across first radios of the first device and second radios of the second device based on a defined performance level determined from a policy applied to the first device and the second device.

2. The method of claim 1, further comprising:
    prior to the sharing, selecting, by the system, the power distribution setting from a group of power distribution settings based on a determination that the power distribution setting satisfies a defined power limit of the first device and reduces an amount of electromagnetic exposure to a user of the first device.

3. The method of claim 2, wherein the selecting comprises facilitating an emission of a defined amount of power in a defined time quantile.

4. The method of claim 2, wherein the selecting comprises selecting the power distribution setting based on a first location of the first device and a second location of the second device in relation to network equipment.

5. The method of claim 1, wherein the aggregating comprises aggregating the first statistics, the second statistics, the first information indicative of the first power output, and the second information indicative of the second power output based on respective environmental contexts determined to be applicable to the first device and the second device.

6. The method of claim 1, further comprising:
    prior to the aggregating, determining, by the system, the power distribution setting based on a historical radio power usage of the first device, a historical performance result of the first device, a current location of the first device, and an application currently executing on the first device.

7. The method of claim 1, wherein the power distribution setting is a first power distribution setting, and wherein the method further comprises:
    using a historical radio power usage and associated performance results for the first device, training, by the system, a model, wherein the training comprises training the model to a defined confidence level; and
    applying, by the system, the model to identify at least a second power distribution setting for at least a third device based on the defined confidence level, wherein the second power distribution setting is applied across a third group of radios of the third device.

8. The method of claim 1, wherein the first device is classified as an internet of everything device.

9. The method of claim 1, wherein the first device is configured to operate according to at least a fifth generation network communication protocol.

10. A system, comprising:
    a processor; and
    a memory that stores executable instructions that, when executed by the processor, facilitate performance of operations, comprising:
        aggregating respective statistics and respective power output from a first user equipment and a second user equipment; and
        collaborating with the second user equipment to achieve a defined performance level based on a policy applied to the first user equipment and the second user equipment, wherein the collaborating comprises sharing a power distribution setting across radios of the first user equipment and the second user equipment.

11. The system of claim 10, wherein the operations further comprise:
    prior to the aggregating, selecting the power distribution setting from a group of power distribution settings based on a determination that the power distribution setting satisfies a defined power limit and reduces an amount of electromagnetic exposure resulting from operation of the first user equipment.

12. The system of claim 11, wherein the selecting comprises facilitating an emission of a defined amount of power in a defined time quantile.

13. The system of claim 11, wherein the selecting comprises selecting the power distribution setting based on a past radio power usage, a past performance result, a current location, and an application currently executing on the first user equipment.

14. The system of claim 11, wherein the operations further comprise:
    prior to the aggregating, implementing the power distribution setting across the radios of the first user equipment and the second user equipment;
    receiving, from the first user equipment, feedback related to the power distribution setting; and based on the feedback, applying reinforcement learning to a subsequent selection of the power distribution setting subsequent to the selecting.

15. The system of claim 10, wherein the first user equipment is classified as an internet of things device.

16. The system of claim 10, wherein the first user equipment is configured to operate according to a new radio network communication protocol.

17. A non-transitory machine-readable medium, comprising executable instructions that, when executed by a processor, facilitate performance of operations, comprising:
 aggregating respective statistics and respective power output from a first user equipment and a second user equipment, wherein the first user equipment and the second user equipment are determined to be collaborating equipment; and
 sharing a power distribution setting across first radios of the first user equipment and second radios of the second user equipment based on a defined performance level determined from a policy applied to the first user equipment and the second user equipment.

18. The non-transitory machine-readable medium of claim 17, wherein the operations further comprise:
 prior to the aggregating, determining the power distribution setting based on a historical radio power usage of the first user equipment, a historical performance result of the first user equipment, a current location of the first user equipment, and an application currently executing on the first user equipment.

19. The non-transitory machine-readable medium of claim 17, wherein the operations further comprise:
 determining a power limit assigned to the first user equipment and an amount of electromagnetic exposure caused by the first user equipment; and
 configuring the power distribution setting based on retaining the amount of electromagnetic exposure below a defined amount of electromagnetic exposure over a defined period of time.

20. The non-transitory machine-readable medium of claim 17, wherein the power distribution setting is configurable based on changing conditions at the first user equipment.

* * * * *